United States Patent

[11] 3,555,995

| [72] | Inventor | Victor M. Berger<br>200—17 50th Ave., Bayside, N.Y. 11364 |
|------|----------|----------------------------------------------------------|
| [21] | Appl. No. | 801,085 |
| [22] | Filed | Feb. 20, 1969 |
| [45] | Patented | Jan. 19, 1971 |

[54] ELECTRIC GRILL
2 Claims, 4 Drawing Figs.

[52] U.S. Cl. .................................................... 99/446, 99/450
[51] Int. Cl. ........................................................ A47j 37/00
[50] Field of Search ............................................. 99/446, 444, 445, 447, 259, 331, 340, 402, 421, 425, 375; 126/21; 219/377, 400, 445, 455; 99/400, 408, 450

[56] References Cited
UNITED STATES PATENTS

| 2,243,993 | 6/1941 | Watson | 99/402X |
| 2,764,080 | 9/1956 | Knapp | 99/446X |
| 3,225,682 | 12/1965 | Savio | 99/446 |
| 3,246,690 | 4/1966 | Fry | 219/400 |
| 3,324,844 | 6/1967 | Huffman | 126/21(A) |
| 3,444,805 | 5/1969 | Happel et al. | 99/340 |

*Primary Examiner*—Walter A. Scheel
*Assistant Examiner*—Arthur O. Henderson
*Attorney*—Myron Amer

ABSTRACT: A cooking unit having a horizontally oriented electric grill serving as a food cooking surface and an exhaust blower located beneath the grill which not only effectively removes visible smoke and odors but also contributes to prompt removal of food drippings and the like from the cooking surface to a remote location at which the reduced temperature is such as to minimize the possibility of fat fires or the like due to ignition of these drippings.

PATENTED JAN 19 1971
3,555,995
FIG.1
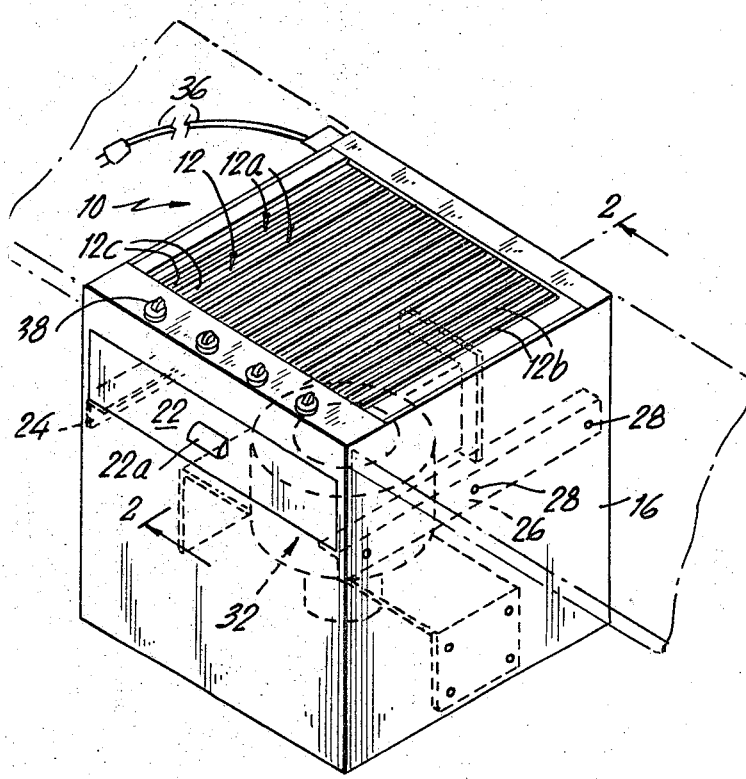
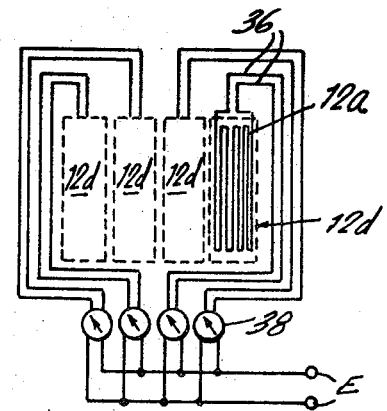
FIG. 4
FIG. 2
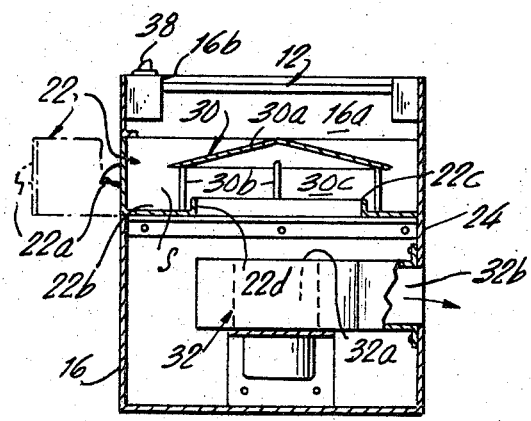
FIG. 3
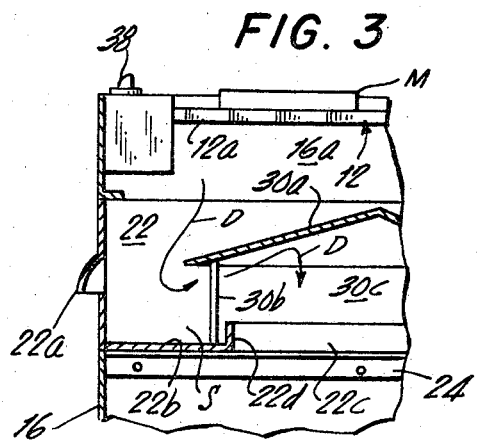
INVENTOR.
VICTOR M. BERGER
Myron Amer
ATTORNEY

ELECTRIC GRILL

The present invention relates generally to cooking units, and more particularly to an improved cooking unit intended primarily for domestic or home use.

Domestic cooking units are usually associated with an exhaust system since kitchens typically are not large and therefore require the effective removal of visible smoke and odors resulting from cooking. While there is similarly a ventilation problem in the operation of commercial cooking units in luncheonettes and the like, the kitchen areas of commercial units are usually much larger and thus the problem is not critical. As generally understood, a typical exhaust system for a domestic cooking unit includes an exhaust blower and an overhead hood through which visible smoke and odors are upwardly drawn and exhausted to atmosphere. While an overhead exhaust system, as just described, achieves its intended purpose of smoke and order removal, it does not solve other significant problems associated with domestic cooking units such as minimizing or eliminating fat fires resulting from the ignition of food drippings, maintaining the kitchen area cooler in the summer months, or similar such problems.

Broadly, it is an object of the present invention to provide an improved domestic cooking unit overcoming the foregoing and other shortcomings of the prior art. Specifically, it is an object to provide an improved domestic unit employing an electrified cooking surface or grate and to combine with such a cooking surface an exhaust system which takes full advantage of the fact that cooking by the electrified grate is achieved by conduction or contact with the food. Specifically, the exhaust system in question is given an advantageous position located beneath the grate and in this advantageous position is capable of not only removing visible smoke and odors but also in contributing to the gravity flow of the food drippings to a remote area where fat fires are obviated, as well as providing other benefits all as will be described in greater detail subsequently herein.

A domestic cooking unit demonstrating objects and advantages of the present invention includes, as already noted, the combination of an electrified grate and an exhaust blower located beneath the grate, the latter not only operating as an effective smoke and removal means but also as a means effectively contributing to prompt gravity flow removal of feed drippings to a remote surface located beneath the cooking surface at which the temperature is such as to minimize the ignition of these food drippings. Additionally, the surface in question is slidably mounted in the cooking unit so that it is readily movable between its operative position located internally of the housing, in which it effectively catches the food drippings, and an exposed position therefrom in which it is readily cleaned.

The above brief description, as well as further objects, features and advantages of the present invention, will be more fully appreciated by reference to the following detailed description of a presently preferred, but nevertheless illustrative, embodiment in accordance with the present invention, when taken in conjunction with the accompanying drawings, wherein:

FIG. 1 is a perspective view, with internal portions thereof shown in phantom perspective, of a cooking unit exemplary of the present invention;

FIG. 2 is an elevational view, in section taken on line 2-2 of FIG. 1, illustrating internal features thereof;

FIG. 3 is a partial sectional elevational view, on an enlarged scale, showing further details of the internal structural features thereof; and FIG. 4 is a schematic view of the electrical circuitry for the conduction heating elements as might be used in the foregoing or another embodiment of the heating unit hereof.

Reference is now made to the drawings wherein there is shown an improved cooking unit, generally designated 10, demonstrating features and advantages of the present invention. Cooking unit 10, as will be described in more detail herein, employs a conduction heat source, generally designated 12, which, by definition, has actual physical surface contact with the food being cooked and thus provides, because of the intensity of the heat capable of being applied by physical contact with the food surface, a charring of the surface and, in the case of meat, a searing of the contacted surface. The charred and seared food surface has a desirable charcoal flavor and also is effective in preventing the drainage of fluids from the food during the cooking interval.

Cooperating with the conduction heat source 12 is a downdraft ventilation system created by the operation of a blower 32 which, as will be subsequently described in greater detail herein, eliminates visible smoke and odors, minimizes fat fires due to ignition of food drippings, as well as providing other noteworthy advantages and benefits.

Turning now to structural details, the illustrated embodiment of the cooking unit 10 includes a main lower rectangular housing 16 having an internal compartment 16a which has an upper rectangular opening 16b occupied by the previously noted conduction heat source 12. Specifically, the conduction heat source 12 may include a plurality of identically constructed tubular members 12a (only two of which, for clarity's sake, are designated in FIG. 1) which each have an upper cooking surface 12b on which, as clearly shown in FIG. 3, the food which may consist of a cut of meat M is physically supported during cooking. Although not shown, internally each element 12a includes an electrically energized resistance element which is raised to cooking temperature in response to the flowing of electricity therethrough, all as is well understood by those familiar with electrically energized heating elements. Pertinent to the present invention it should be noted that adjacent elements 12a of the conduction heat source 12 bound a clearance space 12c therebetween, the significance of which spaces 12c will soon be apparent.

Situated immediately below the electrified grate or conduction heat source 12 is a slidable drawer 22 having a front hand grip 22a thereon and slidably movable from an internal position within the lower housing 16, illustrated in full line in FIG. 2, into an accessible position extending laterally therefrom, illustrated in phantom perspective in FIG. 2. Spaced apart opposite guide rails 24, 26 appropriately secured, as at 28, to the sidewalls of the lower housing 16 support the drawer 22 during sliding movement thereof. Drawer 22 includes a bottom wall 22b having a central opening 22c therein and a drip pan construction 30 in a supported elevated position above the opening 22c. More particularly, the construction 30 includes a slanted or inclined upper panel or baffle 30a supported on circumferentially spaced supports 30b in a raised clearance position which provides openings 30c in communication with the previously noted central opening 22c. It should be noted that opening 22c is bounded by a circular upstanding lip 22d which cooperates with the side, front, rear and bottom walls of the drawer 22 to define a temporary storage compartment S for liquid drippings from the food M. That is, whatever drippings flow by gravity from the food M through the grate openings 12c fall onto the slanted walls 30a and flow into the compartment S. It should be further noted that the overhang of the slanted wall 30a is well beyond the lip 22d of the opening 22c so as to minimize and for all practical purposes prevent the flowing of this liquid through the openings 30c and into the opening 22c. Instead, as already noted, the tendency is for these liquid drippings to flow into the compartment S from which the same are periodically removed and the construction 30 conveniently cleaned by sliding the drawer 22 into its exposed position from the housing 16.

It is significant to note that by virtue of the clearance position of the drawer 22 well below the grate or cooking surface 12 that there is a minimum possibility of "fat" fires occuring due to ignition of drippings from the food M. Further, these food drippings fall to the remote compartment or surface S not only by gravity but also under the urgency of the previously noted downdraft system 32, all in the manner as will soon be described.

Completing the construction of the cooking unit 10 and constituting an essential element thereof is an exhaust blower 32, which may be conventionally constructed and be one of numerous models which are now readily commercially available. The blower 32 is supported on a bracket 34 at the base of the internal compartment 16a such that the inlet 32a thereof is immediately below and aligned with the opening 22c and the outlet 32b connected about an appropriate housing exit opening which in turn is ducted to atmosphere. As generally understood, the operation of the exhaust blower 32 is effective in providing the cooking unit 10 with a downdraft ventilation system as one of its essential unique aspects and features. Specifically, and as may be best understood from a consideration of FIG. 3, the draft system herein represented by the direction arrows designated D, is effective in establishing air current flow from about the food M downwardly through the grate openings 12c and through the communicating openings 30c, 22c into the blower inlet 32a. As already noted, the interposed position of the slanted walls 30a between the conduction heat source 12 and the blower inlet 32a effectively separates and removes the liquid content from the gravity flowing materials from the food M and from the heated current of air D so that only substantially dry materials enter the exhaust blower inlet 32a or, in any event, materials in a condition which do not adversely affect the operation of the exhaust blower.

From the foregoing description it should be readily appreciated that in the operation of the cooking unit 10 hereof there is not only the anticipated benefit of effective elimination of all visible smoke and orders, but this is achieved without the need for the usual overhead exhaust hood. Additionally, there are the noteworthy benefits of heat removal in a manner which contributes to cooling of the immediate cooking area, as well as the effective removal of food drippings to a relatively cool, remote location which minimizes the possibility of "fat" fires.

A latitude of modification, change and substitution is intended in the foregoing disclosure and in some instances some features of the invention will be employed without a corresponding use of other features.

I claim:

1. A cooking unit comprising a housing, plural spaced apart horizontally oriented conduction cooking members operatively arranged in said housing to serve as a food supporting surface, an exhaust blower located in a clearance position beneath said conduction cooking members operatively effective to cause air current flow downwardly through the spacing between said members, and a liquid-separating means having an operative interposed position between said food supporting surface and said exhaust blower effective to remove the liquid content from said air current flow prior to the entry thereof into said exhaust flower, said liquid-separating means being movable from said operative interposed position to a cleaning position external of said housing.

2. A cooking unit as defined in claim 1 wherein said liquid-separating means includes a horizontally oriented wall having a centrally located opening therein in alignment with the inlet of said exhaust blower and an inclined baffle operatively mounted in a clearance position above said opening so as to prevent the passage of food drippings through said opening but not the passage of said air current which circumvents said baffle and enters said exhaust blower inlet.